(12) United States Patent
Tsai et al.

(10) Patent No.: US 8,311,065 B2
(45) Date of Patent: Nov. 13, 2012

(54) FIBER LASER SYSTEM

(75) Inventors: Tzong-Yow Tsai, Tainan (TW);
 Shih-Ting Lin, Tainan (TW); Hong-Xi Tsao, Tainan (TW); Chih-Lin Wang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 55 days.

(21) Appl. No.: 13/017,053

(22) Filed: Jan. 31, 2011

(65) Prior Publication Data
 US 2012/0147909 A1 Jun. 14, 2012

(30) Foreign Application Priority Data
 Dec. 10, 2010 (TW) ................................ 99143381 A

(51) Int. Cl.
 *H01S 3/30* (2006.01)
(52) U.S. Cl. ............................................................. 372/6
(58) Field of Classification Search ....................... 372/6
 See application file for complete search history.

(56) References Cited

U.S. PATENT DOCUMENTS

| | | | |
|---|---|---|---|
| 6,061,170 A * | 5/2000 | Rice et al. ................... | 359/345 |
| 6,407,853 B1 | 6/2002 | Samson et al. | |
| 6,560,247 B2 | 5/2003 | Chang et al. | |
| 7,113,328 B2 | 9/2006 | Gomes et al. | |
| 7,508,851 B2 | 3/2009 | Yoshitomi et al. | |
| 2004/0156588 A1* | 8/2004 | Demidov et al. ............. | 385/37 |
| 2008/0130102 A1* | 6/2008 | Murison et al. ............. | 359/341.3 |
| 2009/0285246 A1* | 11/2009 | Seo et al. ...................... | 372/6 |

FOREIGN PATENT DOCUMENTS

TW   I320983   2/2010

OTHER PUBLICATIONS

Tzong-Yow Tsai et al., "Saturable absorber Q- and gain-switched all-Yb3+ all-fiber laser at 976 and 1064 nm", Optics Express, vol. 18, No. 23, issued on Oct. 25, 2010, p. 23523-p. 23528.

* cited by examiner

*Primary Examiner* — Kinam Park
(74) *Attorney, Agent, or Firm* — Jianq Chyun IP Office

(57) ABSTRACT

A fiber laser system including a laser pumping source, first and second wavelength reflectors, first and second gain fibers, and first and second long wavelength reflectors is provided. The laser pumping source is adapted to emit a pumping beam. The first wavelength reflector is coupled to the laser pumping source. The first gain fiber is coupled between the first and the second wavelength reflectors. The first long wavelength reflector is coupled between the first gain fiber and the second wavelength reflector. The second long wavelength reflector is coupled between the first long wavelength reflector and the second wavelength reflector. The second gain fiber is coupled between the first and the second long wavelength reflectors. The diameter of the core of the first gain fiber is greater than the diameter of the core of the second gain fiber.

12 Claims, 4 Drawing Sheets

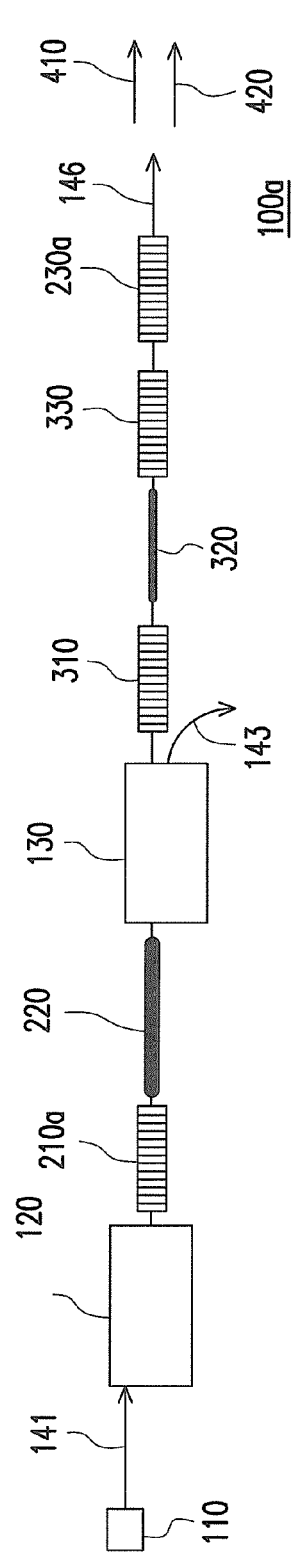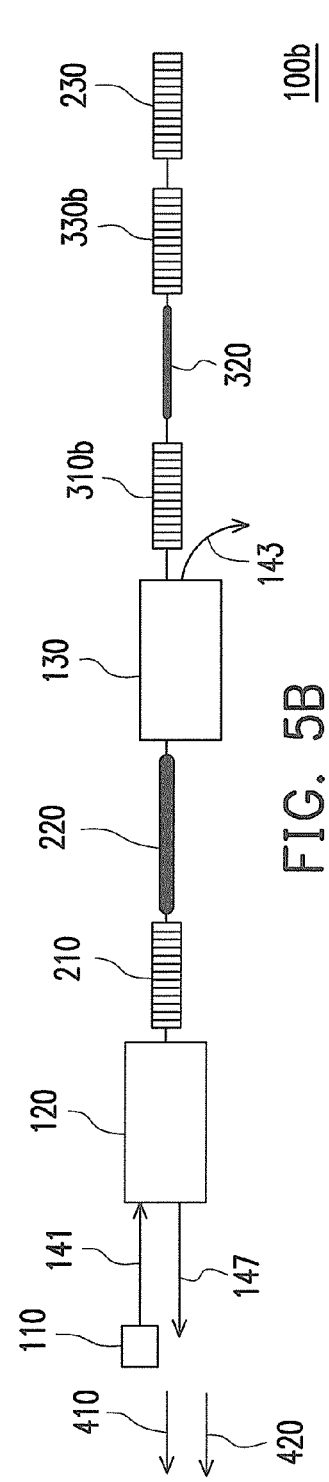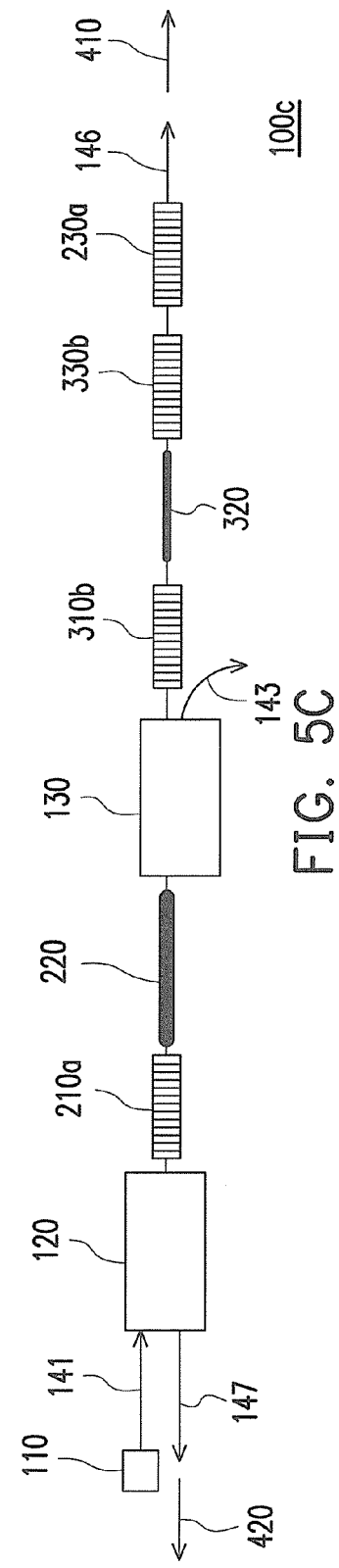

FIBER LASER SYSTEM

CROSS-REFERENCE TO RELATED APPLICATION

This application claims the priority benefit of Taiwan application serial no. 99143381, filed on Dec. 10, 2010. The entirety of the above-mentioned patent application is hereby incorporated by reference herein and made a part of this specification.

TECHNICAL FIELD

The disclosure relates to a laser system, and more particularly, to a fiber laser system.

BACKGROUND

A laser beam has good collimation as well as a capability for high power and intensity. Due to these properties, laser generators are widely applied in modern industries, such as in highly collimated light sources used in laboratories, laser pens for presentations, as well as laser light sources for reading or burning compact discs, laser light sources for the laser mouse, laser light sources for different types of measurement instruments, laser light sources for the display field, laser light sources for fiber communication, laser light sources for instruments used in the medical field, and so on.

When light is transmitted in an optical fiber, since the incident angle on the surface of the fiber is larger than the critical angle of the fiber material, the surface of the fiber totally reflects the light inside the optical fiber. When the totally reflected light is again transmitted to the surface of the optical fiber, the afore-described condition of the incident angle being larger than the critical angle is still met, and thus light is again totally reflected by the surface of the optical fiber. The total reflection above refers to light being totally reflected without loss. Accordingly, the light entering one end of the optical fiber may be transmitted to another end of the optical fiber with low energy loss, and this rate of energy loss is lower than the energy loss incurred by electrons transmitted in wires due to resistance.

As optical fiber techniques matured in recent years, the optical fiber is being applied in the laser field, in which light is transmitted in the optical fiber and reflectors are configured at two ends of the optical fiber, so as to form a resonant cavity. Since the optical fiber is flexible, when the fiber is coiled into a plurality of loops, a resonant cavity of great length may be formed without causing the size of the entire optical system to become overly large. A resonant cavity having this length is hard to achieve with conventional laser techniques.

However, generally speaking, a laser system typically generates a laser beam of one wavelength. Therefore, when laser beams of two or more wavelengths are required at the same time, two laser systems are needed. As such, the costs for purchasing the necessary instruments and equipments drastically increase. Moreover, the application range of a single laser system is also limited.

SUMMARY

A fiber laser system including a laser pumping source, a first wavelength reflector, a second wavelength reflector, a first gain fiber, a first long wavelength reflector, a second long wavelength reflector, and a second gain fiber is introduced herein. The laser pumping source is adapted to emit a pumping beam. The first wavelength reflector is coupled to the laser pumping source. The first gain fiber is coupled between the first wavelength reflector and the second wavelength reflector. The pumping beam is adapted to transmit to the first gain fiber by passing through the first wavelength reflector. The first long wavelength reflector is coupled between the first gain fiber and the second wavelength reflector. The second long wavelength reflector is coupled between the first long wavelength reflector and the second wavelength reflector. The second gain fiber is coupled between the first long wavelength reflector and the second long wavelength reflector. Moreover, the diameter of the core of the first gain fiber is greater than the diameter of the core of the second gain fiber. After the first gain fiber is pumped by the pumping beam, a first wavelength beam is generated in a first resonant cavity formed between the first wavelength reflector and the second wavelength reflector. After the second gain fiber is pumped by the first wavelength beam, a second wavelength beam is generated in a second resonant cavity formed between the first long wavelength reflector and the second long wavelength reflector. The wavelength of the first wavelength beam is shorter than the wavelength of the second wavelength beam. The first wavelength reflector and the second wavelength reflector are adapted to reflect at least a portion of the first wavelength beam, and the first long wavelength reflector and the second long wavelength reflector are adapted to reflect at least a portion of the second wavelength beam.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIGS. 5A, 5B, and 5C are respective simplified schematic structural diagrams of fiber laser systems according to three other exemplary embodiments.

DETAILED DESCRIPTION OF DISCLOSED EMBODIMENTS

Figure 1:
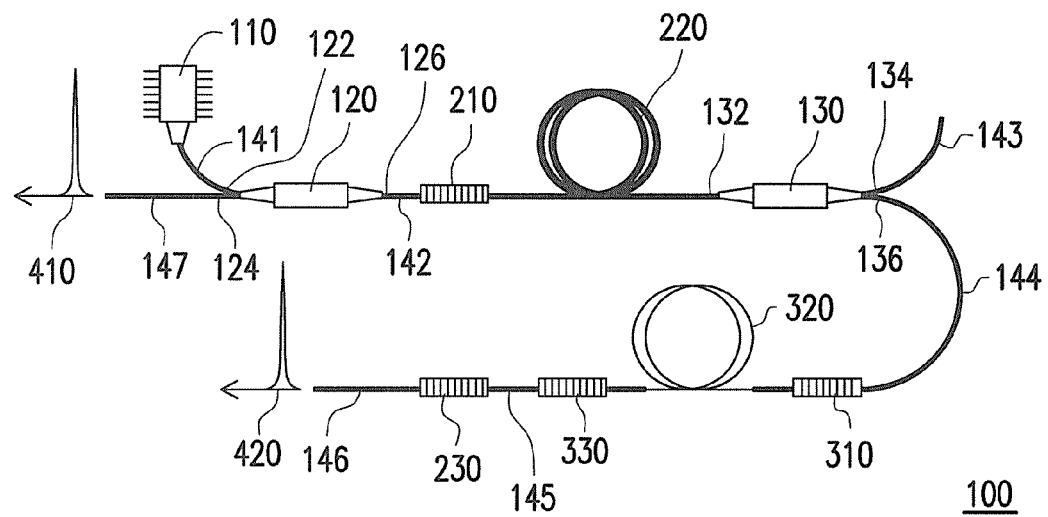
FIG. 1 is a schematic structural diagram illustrating a fiber laser system according to an exemplary embodiment.

FIG. 1 is a schematic structural diagram illustrating a fiber laser system according to an exemplary embodiment. Referring to FIG. 1, a fiber laser system 100 according to the present embodiment includes a laser pumping source 110, a first wavelength reflector 210, a second wavelength reflector 230, a first gain fiber 220, a first long wavelength reflector 310, a second long wavelength reflector 330, and a second gain fiber 320. The laser pumping source 110 is adapted to emit a pumping beam. In the present embodiment, the laser pumping source 110 is, for example, a laser diode, and the pumping beam is a continuous wave laser beam, for instance. In the embodiment, the wavelength of the pumping beam is, for example, 915 nm, but the disclosure is not limited thereto.

The first wavelength reflector 210 is coupled to the laser pumping source 110. In the embodiment, the first wavelength reflector 210 is coupled to the laser pumping source 110 through a fiber 142, a first wavelength division multiplexer 120, and a fiber 141 in sequence. The pumping beam generated by the laser pumping source 110 is transmitted to the first wavelength reflector 210 through the fiber 141, the first wavelength division multiplexer 120, and the fiber 142 in sequence. However, in another embodiment, the first wavelength division multiplexer 120 may be omitted and replaced by a fiber coupling to the laser pumping source 110 and first wavelength reflector 210.

The first gain fiber 220 is coupled between the first wavelength reflector 210 and the second wavelength reflector 230. The pumping beam from the laser pumping source 110 is adapted to transmit to the first gain fiber 220 by passing through the first wavelength reflector 210. In the present embodiment, the first wavelength reflector 210 has no substantial reflection effect on the pumping beam.

The first long wavelength reflector 310 is coupled between the first gain fiber 220 and the second wavelength reflector 230, the second long wavelength reflector 330 is coupled between the first long wavelength reflector 310 and the second wavelength reflector 230, and the second gain fiber 320 is coupled between the first long wavelength reflector 310 and the second long wavelength reflector 330. In the present embodiment, the first gain fiber 220 is coupled to the first long wavelength reflector 310 through a second wavelength division multiplexer 130 and a fiber 144 in sequence. However, in other embodiments, the second wavelength division multiplexer 130 may be omitted, such that the first gain fiber 220 is coupled to the first long wavelength reflector 310 through the fiber 144, or the first gain fiber 220 is directly coupled to the first long wavelength reflector 310. Moreover, in the present embodiment, the second long wavelength reflector 330 and the second wavelength reflector 230 may be coupled through the fiber 145. In the present embodiment, the first wavelength reflector 210, the second wavelength reflector 230, the first long wavelength reflector 310, and the second long wavelength reflector 330 are, for example, a fiber Bragg grating (FBG).

The diameter of the core of the first gain fiber 220 is greater than the diameter of the core of the second gain fiber 320. After the first gain fiber 220 is pumped by the pumping beam from the laser pumping source 110, a first wavelength beam is generated in a first resonant cavity formed between the first wavelength reflector 210 and the second wavelength reflector 230. After the second gain fiber 320 is pumped by the first wavelength beam, a second wavelength beam is generated in a second resonant cavity formed between the first long wavelength reflector 310 and the second long wavelength reflector 330. The wavelength of the first wavelength beam is shorter than the wavelength of the second wavelength beam. The first wavelength reflector 210 and the second wavelength reflector 230 are adapted to reflect at least a portion of the first wavelength beam, and the first long wavelength reflector 310 and the second long wavelength reflector 330 are adapted to reflect at least a portion of the second wavelength beam. In the present embodiment, the first gain fiber 220 and the second gain fiber 320 are flexible and may be freely coiled, for example into a plurality of loops as shown in FIG. 1.

Figure 2:
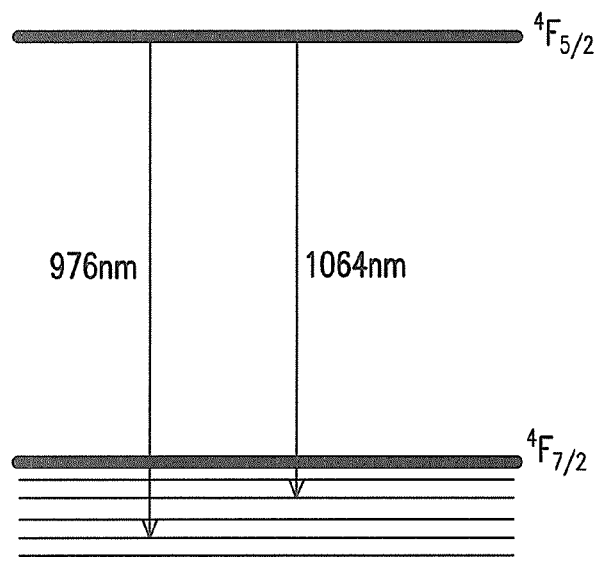
FIG. 2 illustrates the atomic energy levels of the gain mediums in the gain fibers depicted in FIG. 1.
Figure 3:
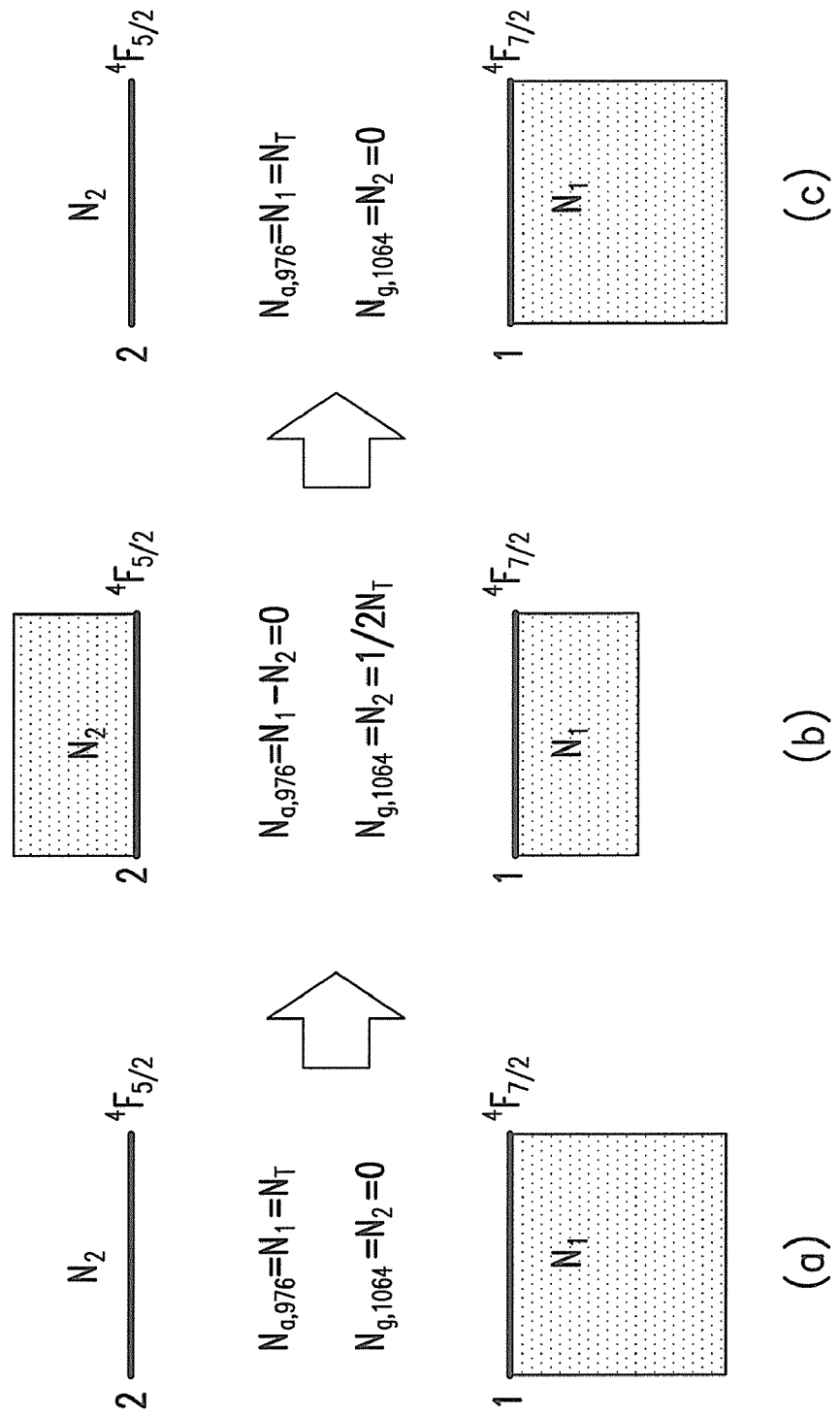
FIG. 3 illustrates the transition states of the electrons in the gain mediums in the gain fibers depicted in FIG. 1.

FIG. 2 illustrates the atomic energy levels of the gain mediums in the gain fibers depicted in FIG. 1, and FIG. 3 illustrates the transition states of the electrons in the gain mediums in the gain fibers depicted in FIG. 1. Referring to FIGS. 1-3, the first gain fiber 220 and the second gain fiber 320 are doped with a gain medium. In the present embodiment, the gain medium is, for example, ytterbium. The gain medium has a first energy level (e.g., a $^4F_{5/2}$ atomic energy level depicted in FIG. 2) and a second energy level (e.g., a $^4F_{7/2}$ atomic energy level depicted in FIG. 2). The first energy level is higher than the second energy level, and the second energy level has a plurality of split energy levels (i.e. each of the horizontal lines parallel to each other located besides the "$^4F_{7/2}$" label in FIG. 2 represents a split energy level). The first wavelength beam is a light (i.e. having a wavelength of 976 nm in the present embodiment) emitted when atoms transition from the first energy level (e.g. $^4F_{5/2}$) to one of the split energy levels (e.g., one of the split energy levels of $^4F_{7/2}$). Moreover, the second wavelength beam is a light (i.e. having a wavelength of 1064 nm in the present embodiment) emitted when atoms transition from the first energy level (e.g. $^4F_{5/2}$) to another one of the split energy levels (e.g., one of the split energy levels of $^4F_{7/2}$).

In the present embodiment, a pumping beam having a wavelength of 915 nm is used to pump the gain medium, so the gain medium may simultaneously absorb light having wavelengths of 915 nm and 976 nm. The energy level $^4F_{5/2}$ is in a meta-stable state and may store a gain population inversion. When the 915 nm pumping beam excites the gain medium so that the gain population inversion becomes a positive value, the ytterbium gain medium becomes the gain medium of a 976 nm laser. Conversely, the ytterbium gain medium becomes a saturable absorber of the 976 nm light.

Since the diameter of the core of the second gain fiber 320 is smaller than the diameter of the core of the first gain fiber 220, the intensity of the 976 nm light in the second gain fiber 320 is higher than the intensity of the 976 nm light in the first gain fiber 220, and therefore the second gain fiber 320 may rapidly transition from the state in FIG. 3(a) to the state in FIG. 3(b). FIG. 3(a) illustrates an original state of the second gain fiber 320 before a Q-switched pulse appears, in which $N_1$ represents the number of atoms at the $^4F_{7/2}$ energy level, $N_2$ represents the number of atoms at the $^4F_{5/2}$ energy level, $N_T$ represents the total number of atoms, $N_{a,976}$ is the absorption population inversion in the saturable absorber, and $N_{g,1064}$ is the population inversion in the gain medium. Moreover, FIG. 3(b) illustrates a saturated state of the second gain fiber 320 absorbing the 976 nm light. At this time, the second gain fiber 320 is in a transparent state for the 976 nm light. A first wavelength laser beam having a wavelength of 976 nm may be formed in the first resonant cavity at this time, and the first wavelength laser beam is a Q-switched pulse laser beam. Thereafter, the second gain fiber 320 changes from a saturable absorber to a laser gain medium for 1030 nm to 1100 nm (e.g. 1064 nm) light, so as to form a second wavelength laser beam in the second resonant cavity, for example a 1064 nm pulsed laser beam. At this time, the formation of the second wavelength laser beam is a result of the second gain fiber 320 transitioning from the state in FIG. 3(b) to the state in FIG. 3(c). In other words, the electrons again return to the $^4F_{7/2}$ energy level. Moreover, when the second gain fiber 320 is in the state depicted in FIG. 3(c), the second gain fiber 320 has returned to the state in FIG. 3(a). Thereafter, when the pumping beam 141 proceeds to provide the pumping beam, the states in FIGS. 3(a)-3(c) are repeated again and again so the fiber laser system emits pulsed laser beams having wavelengths of 976 nm and 1064 nm again and again.

In the present embodiment, the reflectivity of the first wavelength reflector 210 is lower than the reflectivity of the second wavelength reflector 230. For example, the reflectivity of the first wavelength reflector 210 is, for example, approximately 11%. The second wavelength reflector 230 is, for example, a highly reflective reflector having a reflectivity of 95% or more. Accordingly, the first wavelength beam exits the first resonant cavity from the first wavelength reflector 210 to form a first wavelength laser beam 410 (as shown in FIG. 1) emitted from the fiber laser system 100, for example, a laser beam having a wavelength of 976 nm. Moreover, in the present embodiment, the reflectivity of the first long wavelength reflector 310 is higher than the reflectivity of the second long wavelength reflector 330. In addition, the second wavelength beam exits from the second resonant cavity from the second long wavelength reflector 230 to form a second wavelength laser beam 420 (as shown in FIG. 1) emitted from the fiber laser system 100, for example, a laser beam having a wavelength of 1064 nm. However, the reflectivities of the reflectors described above are used merely as an illustrative example. The reflectivity values of the reflectors may be adjusted to other values to fit a requirement.

In the present embodiment, the first wavelength division multiplexer 120 has a first terminal 122, a second terminal 124, and a third terminal 126. The pumping beam from the laser pumping source 110 is adapted to transmit to the first wavelength reflector 210 by passing through the first terminal 122 and the third terminal 126 in sequence. The first wavelength beam from the first wavelength reflector 210 is adapted to transmit out of the fiber laser system 100 by passing through the third terminal 126 and the second terminal 124 in sequence. Specifically, the fiber 141 is coupled to the first terminal 122, the fiber 142 is coupled to the third terminal 126, and a fiber 147 may be adopted to couple to the second terminal 124. Accordingly, the first wavelength laser beam 410 may be transmitted out of the fiber laser system 100 by passing through the first wavelength reflector 210, the fiber 142, the wavelength division multiplexer 120, and the fiber 147 in sequence. Moreover, a fiber 146 may be adopted to couple to the second wavelength reflector 230. Therefore, the second wavelength laser beam 420 may be transmitted out of the fiber laser system 100 by passing through the second long wavelength reflector 330, the fiber 145, the second wavelength reflector 230, and the fiber 146 in sequence.

Moreover, in the present embodiment, the second wavelength division multiplexer 130 has a fourth terminal 132, a fifth terminal 134, and a sixth terminal 136. The pumping beam is adapted to transmit out of the fiber laser system 100 by passing through the fourth terminal 132 and the fifth terminal 134 in sequence. In addition, the first wavelength beam from the first gain fiber 220 is adapted to transmit to the first long wavelength reflector 310 by passing through the fourth terminal 132 and the sixth terminal 136 in sequence. Specifically, the first gain fiber 220 is coupled to the fourth terminal 132, the fiber 144 is coupled to the sixth terminal 136, and a fiber 143 may be adopted to couple to the fifth terminal 134. The pumping beam from the first gain fiber 220 may be filtered from the fiber laser system 100 by passing through the second wavelength division multiplexer 130 and the fiber 143 in sequence, so as to reduce interference while generating the first laser beam 410 and the second laser beam 420. In addition, the first wavelength beam from the first gain fiber 220 is adapted to transmit to the first long wavelength reflector 310 by passing through the second wavelength division multiplexer 130 and the fiber 144 in sequence.

Figure 4:
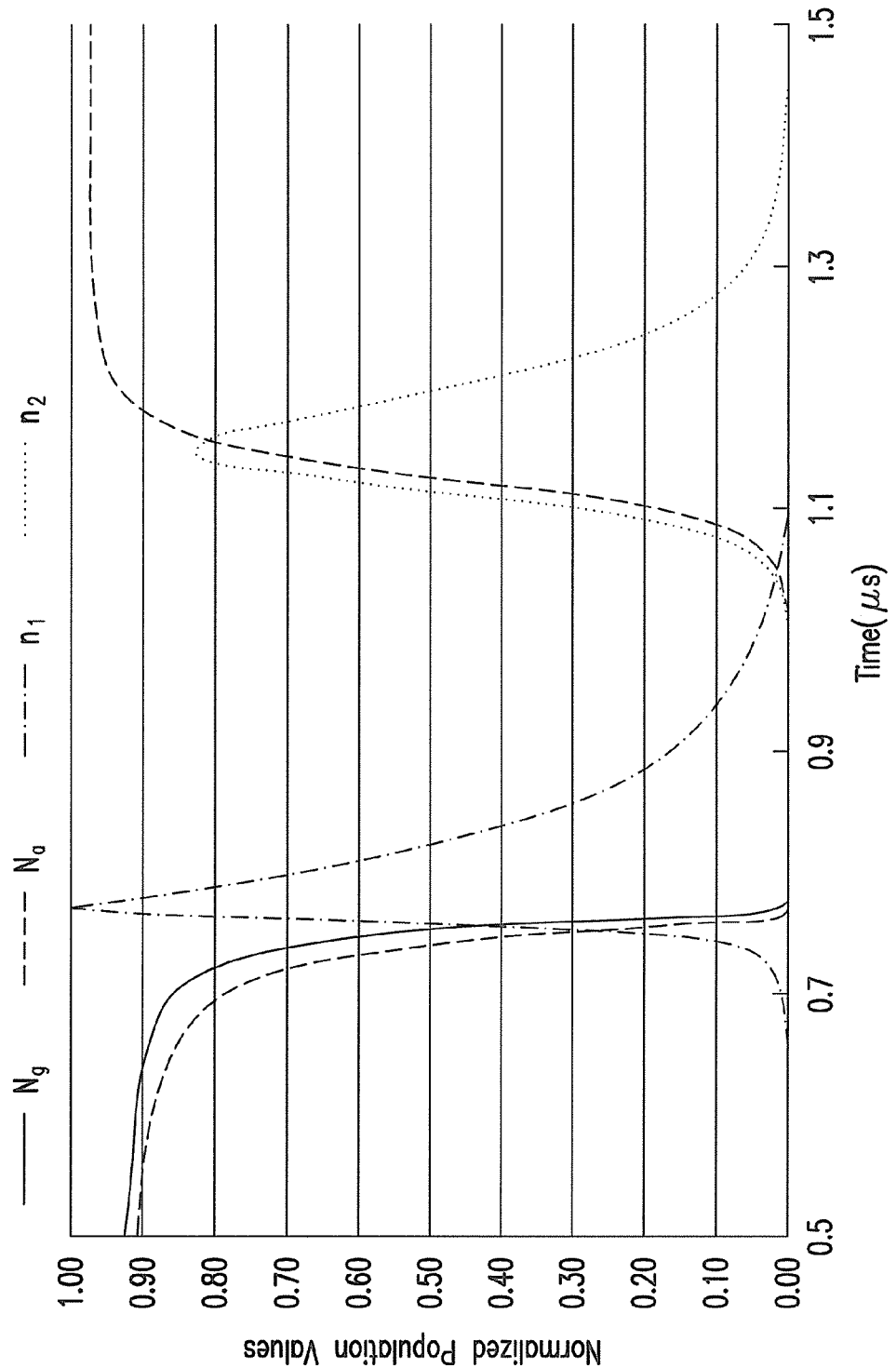
FIG. 4 is a curve diagram illustrating a time-varying population of the fiber laser system depicted in FIG. 1.

FIG. 4 is a curve diagram illustrating a time-varying population of the fiber laser system depicted in FIG. 1. Referring to FIGS. 1, 3, and 4, a $N_g$ curve in FIG. 4 represents a population variation of a gain population inversion, a $N_a$ curve represents a population variation of an absorption population inversion, a $n_1$ curve represents a population variation of the 976 nm photons, and a $n_2$ curve represents a population variation of the 1064 nm photons. As shown in FIG. 4, a 1064 nm laser beam (i.e. the second wavelength laser beam 430) is generated at a slightly later time point than a 976 nm laser beam (i.e. the first wavelength laser beam 410).

The aforementioned 915 nm, 976 nm, and 1064 nm light are merely used as an illustrative example, and the disclosure is not limited thereto. In some embodiments, the wavelength of the pumping beam may fall within a 900-930 nm range, so the wavelength of the first wavelength beam is within a 950-990 nm range, and the wavelength of the second wavelength beam is within a 1010-1150 range.

Since the fiber laser system 100 of the present embodiment adopts the first gain fiber 220 and the second gain fiber 320 with two different thicknesses, such that the intensity of light in the thinner second gain fiber 320 is higher, the second gain fiber 320 may switch between functioning as a saturable absorber and a gain medium. Accordingly, pulsed lasers may be generated. Moreover, when the second gain fiber 320 switches to functioning as the gain medium, a pulsed laser having another wavelength may be generated. Thus, the fiber laser system 100 of the present embodiment may generate two different lasers with a single system, and thereby save an equipment purchasing cost and enlarge an applicability range of the fiber laser system 100. For example, when laser beams of two different wavelengths are required, the fibers 147 and 146 may be respectively directed to the needed areas. However, when a laser beam of only one of the wavelengths is required, one of the fibers 147 and 146 may be directed to the needed area. Additionally, in another embodiment, reflectors having a high reflectivity (e.g. a highly reflective Bragg grating of greater than 95% reflectivity) may be employed concurrently to serve as the first long wavelength reflector 310 and the second long wavelength reflector 330. Therefore, the fiber laser system only emits the first wavelength laser beam 410 but does not emit the second wavelength laser beam 420.

FIGS. 5A, 5B, and 5C are respective simplified schematic structural diagrams of the fiber laser systems according to three other exemplary embodiments. Referring to FIGS. 5A-5C, the fiber laser systems 100a, 100b, and 100c depicted in these three drawings are similar to the fiber laser system 100 depicted in FIG. 1, and a main difference is further elaborated as follows. In the fiber laser system 100a of FIG. 5A, the reflectivity of a first wavelength reflector 210a is greater than the reflectivity of a second wavelength reflector 230a. For example, the first wavelength reflector 210a is a reflector with a high reflectivity. At the same time, the reflectivity of the first long wavelength reflector 310 is greater than the reflectivity of the second long wavelength reflector 330. Accordingly, the first wavelength beam exits the first resonant cavity from the second wavelength reflector 230a to form the first wavelength laser beam 410 emitted from the fiber laser system 100a. In other words, the first wavelength laser beam 410 and the second wavelength laser beam 420 are both emitted from a side having the second wavelength reflector 230a, for example from the fiber 146. In the fiber laser system 100b of FIG. 5B, the reflectivity of a first long wavelength reflector 310b is lower than the reflectivity of a second long wavelength reflector 330b. For example, the second long wavelength reflector 330b is a reflector with a high reflectivity. At the same time, the reflectivity of the first wavelength reflector 210 is lower than the reflectivity of the second wavelength reflector 230. Accordingly, the second wavelength beam exits the second resonant cavity from the first long wavelength reflector 310b to form the second wavelength laser beam 420 emitted from the fiber laser system 100b. In other words, the first wavelength laser beam 410 and the second wavelength laser beam 420 are both emitted from a side having the first wavelength reflector 210, for example, from the fiber 147. In the fiber laser system 100c of FIG. 5C, the reflectivity of the first wavelength reflector 210a is greater than the reflectivity of the second wavelength reflector 230a. Moreover, the reflectivity of the first long wavelength reflector 310b is lower than the reflectivity of the second long wavelength reflector 330b. Therefore, the first wavelength laser beam 410 is emitted from a side having the second wavelength reflector 230a, for example, from the fiber 146. In addition, the second wavelength laser beam 420 is emitted from a side having the first wavelength reflector 210a, for example, from the fiber 147.

In view of the foregoing, since the fiber laser system according to an embodiment adopts the first gain fiber and the second gain fiber with two different thicknesses, such that the intensity of light in the thinner second gain fiber is higher, the second gain fiber may switch between functioning as a saturable absorber and a gain medium. Accordingly, pulsed lasers may be generated. Moreover, when the second gain fiber switches to functioning as the gain medium, a pulsed laser having another wavelength may be generated. Therefore, the fiber laser system according to an embodiment may generate two different lasers with a single system, and thereby save an equipment purchasing cost and enlarge an applicability range of the fiber laser system.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A fiber laser system, comprising:
    a laser pumping source adapted to emit a pumping beam;
    a first wavelength reflector coupled to the laser pumping source;
    a second wavelength reflector;
    a first gain fiber coupled between the first wavelength reflector and the second wavelength reflector, wherein the pumping beam is adapted to transmit to the first gain fiber by passing through the first wavelength reflector;
    a first long wavelength reflector coupled between the first gain fiber and the second wavelength reflector;
    a second long wavelength reflector coupled between the first long wavelength reflector and the second wavelength reflector; and
    a second gain fiber coupled between the first long wavelength reflector and the second long wavelength reflector, wherein the diameter of the core of the first gain fiber is greater than the diameter of the core of the second gain fiber, a first wavelength beam is generated in a first resonant cavity formed between the first wavelength reflector and the second wavelength reflector after the first gain fiber is pumped by the pumping beam, a second wavelength beam is generated in a second resonant cavity formed between the first long wavelength reflector and the second long wavelength reflector after the second gain fiber is pumped by the first wavelength beam, the wavelength of the first wavelength beam is shorter than the wavelength of the second wavelength beam, the first wavelength reflector and the second wavelength reflector are adapted to reflect at least a portion of the first wavelength beam, the first long wavelength reflector and the second long wavelength reflector are adapted to reflect at least a portion of the second wavelength beam, and the material of a gain medium doped in the first gain fiber is the same as the material of a gain medium doped in the second fiber.

2. The fiber laser system as claimed in claim 1, wherein the first gain fiber and the second gain fiber are doped with the gain medium having a first energy level and a second energy level, the first energy level is higher than the second energy level, and the second energy level has a plurality of split energy levels, the first wavelength beam is a light emitted when atoms thereof transition from the first energy level to one of the split energy levels, and the second wavelength beam is a light emitted when atoms thereof transition from the first energy level to another one of the split energy levels.

3. The fiber laser system as claimed in claim 2, wherein the gain medium is ytterbium.

4. The fiber laser system as claimed in claim 1, wherein the wavelength of the pumping beam is within a range of 900 to 930 nm, the wavelength of the first wavelength beam is within a range of 950 to 990 nm, and the wavelength of the second wavelength beam is within a range of 1010 to 1150 nm.

5. The fiber laser system as claimed in claim 1, wherein the first wavelength reflector, the second wavelength reflector, the first long wavelength reflector, and the second long wavelength reflector are each a fiber Bragg grating.

6. The fiber laser system as claimed in claim 1, wherein the reflectivity of the first wavelength reflector is lower than the reflectivity of the second wavelength reflector, and the first wavelength beam exits the first resonant cavity from the first wavelength reflector to form a first wavelength laser beam emitted from the fiber laser system.

7. The fiber laser system as claimed in claim 1, wherein the reflectivity of the first wavelength reflector is greater than the reflectivity of the second wavelength reflector, and the first wavelength beam exits the first resonant cavity from the second wavelength reflector to form a first wavelength laser beam emitted from the fiber laser system.

8. The fiber laser system as claimed in claim 1, wherein the reflectivity of the first long wavelength reflector is lower than the reflectivity of the second long wavelength reflector, and the second wavelength beam exits the second resonant cavity from the first long wavelength reflector to form a second wavelength laser beam emitted from the fiber laser system.

9. The fiber laser system as claimed in claim 1, wherein the first long wavelength reflector and the second long wavelength reflector are each a fiber Bragg grating having a high reflectivity.

10. The fiber laser system as claimed in claim 1, wherein the reflectivity of the first long wavelength reflector is greater than the reflectivity of the second long wavelength reflector, and the second wavelength beam exits the second resonant cavity from the second long wavelength reflector to form a second wavelength laser beam emitted from the fiber laser system.

11. The fiber laser system as claimed in claim 1, further comprising a first wavelength division multiplexer coupled between the laser pumping source and the first wavelength reflector, wherein the first wavelength division multiplexer has a first terminal, a second terminal, and a third terminal, the pumping beam is adapted to transmit to the first wavelength reflector by passing through the first terminal and the third terminal in sequence, and the first wavelength beam from the first wavelength reflector is adapted to transmit out of the fiber laser system by passing through the third terminal and the second terminal in sequence.

12. The fiber laser system as claimed in claim 1, further comprising a second wavelength division multiplexer coupled between the first gain fiber and the first long wavelength reflector, wherein the second wavelength division multiplexer has a fourth terminal, a fifth terminal, and a sixth terminal, the pumping beam is adapted to transmit out of the fiber laser system by passing through the fourth terminal and the fifth terminal in sequence, and the first wavelength beam from the first gain fiber is adapted to transmit to the first long wavelength reflector by passing through the fourth terminal and the sixth terminal in sequence.

* * * * *